United States Patent
Bates et al.

[11] Patent Number: 5,911,790
[45] Date of Patent: Jun. 15, 1999

[54] REPLACEABLE SNAP-IN END FITTING FOR A CABLE CONTROL

[75] Inventors: Wayne L. Bates, Grand Blanc; Srinath Srinivas, Rochester Hills, both of Mich.

[73] Assignee: Teleflex Corporation, Plymouth Meeting, Pa.

[21] Appl. No.: 08/985,457

[22] Filed: Dec. 5, 1997

[51] Int. Cl.$^6$ .................................................. F16C 1/26
[52] U.S. Cl. ............................... 74/502.4; 74/501.5 R; 74/502.6; 248/56
[58] Field of Search .......................... 74/501.5 R, 502.4, 74/502.6; 248/56; 403/329, 294; 285/305, 319

[56] References Cited

U.S. PATENT DOCUMENTS

| | | |
|---|---|---|
| 2,424,757 | 7/1947 | Klumpp, Jr. . |
| 2,430,809 | 11/1947 | Flora et al. ............................. 74/502.4 |
| 2,559,759 | 7/1951 | Swart . |
| 2,869,905 | 1/1959 | Bratz . |
| 2,891,103 | 6/1959 | Swengel . |
| 2,954,248 | 9/1960 | Brickman . |
| 3,139,768 | 7/1964 | Biesecker ............................... 74/502.4 |
| 3,221,572 | 12/1965 | Swick ........................................ 248/56 |
| 3,366,405 | 1/1968 | Sevrence . |
| 3,528,313 | 9/1970 | Berno . |
| 3,631,738 | 1/1972 | Harper . |
| 4,074,945 | 2/1978 | Kraus et al. . |
| 4,131,379 | 12/1978 | Gordy et al. . |
| 4,261,221 | 4/1981 | Kobayashi . |
| 4,324,503 | 4/1982 | Sevrence . |
| 4,407,042 | 10/1983 | Schramme et al. ...................... 248/56 |
| 4,458,552 | 7/1984 | Spease et al. . |
| 4,534,239 | 8/1985 | Heimann . |
| 4,621,937 | 11/1986 | Maccuaig . |
| 4,626,620 | 12/1986 | Plyler . |
| 4,657,212 | 4/1987 | Gilmore et al. . |
| 4,682,513 | 7/1987 | Reeder . |
| 5,702,076 | 12/1997 | Humber ..................................... 248/56 |

FOREIGN PATENT DOCUMENTS

| | | | |
|---|---|---|---|
| 2532381 | 3/1984 | France .................................. 74/502.4 |

*Primary Examiner*—John A. Jeffery
*Assistant Examiner*—Chong H. Kim
*Attorney, Agent, or Firm*—Howard & Howard

[57] ABSTRACT

A motion transmitting remote control assembly (10) comprising a conduit (12) and a motion transmitting core element (14) movably supported in the conduit (12). A support fitting (16) supports the conduit (12) through an aperture (18) in a support structure (20) and includes a body portion (22 and 24) and first integral abutment (26) for abutting one extremity of the aperture (18) and second integral abutment (28) spaced along the body portion (22 and 24) from the first abutment (26). A U-shaped retaining member (30) is removably mounted on the body portion (22 and 24) and has a first surface (32) engaging the second abutment (28). The assembly (10) is characterized by the retaining member (30) including a pair of tabs (34) extending outwardly in a cantilever fashion from a position adjacent the first surface (32) to distal ends for engaging the support structure (20) about the aperture (18) for retaining the support fitting (16) tightly in the aperture (18) whereby the retaining member (30) may be removed from the body portion (22 and 24) and replaced by another like retaining member. The retaining member 30 extends between the two spaced abutments 26 and 28 of the support fitting 16 so that the retaining member 30 must be retained on the support fitting 16 when disposed in the aperture 18.

9 Claims, 2 Drawing Sheets

REPLACEABLE SNAP-IN END FITTING FOR A CABLE CONTROL

TECHNICAL FIELD

This invention relates to a motion transmitting remote control assembly which is normally operated to control a device by transmitting motion in a curved path by a flexible motion transmitting core element.

More specifically, the instant invention relates to a retaining means for retaining an otherwise non-reusable end fitting of such a control assembly supported within an aperture in a support structure wherein the end fitting had a pair of legs extending therefrom for retaining the end fitting within the aperture which were broken off.

BACKGROUND OF THE INVENTION

There are several motion transmitting remote control assemblies which include cantilevered tabs extending toward an abutment for insertion through an aperture in a support structure for the abutment abutting one side of the aperture and the tabs engaging the aperture on the other side. As alluded to above, it frequently occurs that these tabs are broken off in service and, since the tabs are integrally molded with the remainder of the end fitting, the entire control must be removed and replaced. This problem was addressed in U.S. Pat. No. 4,458,552 to Spease et al. and assigned to the assignee of the instant invention. Spease et al solve the problem by providing a replacement member to replace the tabs when the tabs are broken off; however, the replacement member does not provide the same retention because it does not have the tabs. There is, therefore, a need for a removable retention member which is initially installed with the control assembly but which upon damage may be replaced with exactly the same part with exactly the same retention forces.

SUMMARY OF THE INVENTION AND ADVANTAGES

A motion transmitting remote control assembly comprising a conduit, a motion transmitting core element movably supported in the conduit, a support fitting for supporting the conduit through an aperture in a support structure and including a body portion and first integral abutment means for abutting one extremity of the aperture and second integral abutment means spaced along the body portion from the first abutment means. A U-shaped retaining member is removably mounted on the body portion and has a first surface engaging the second abutment. The assembly is characterized by the retaining member including a pair of tabs extending outwardly in a cantilever fashion from a position adjacent the first surface to distal ends for engaging the support structure about the aperture for retaining the fitting tightly in the aperture.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
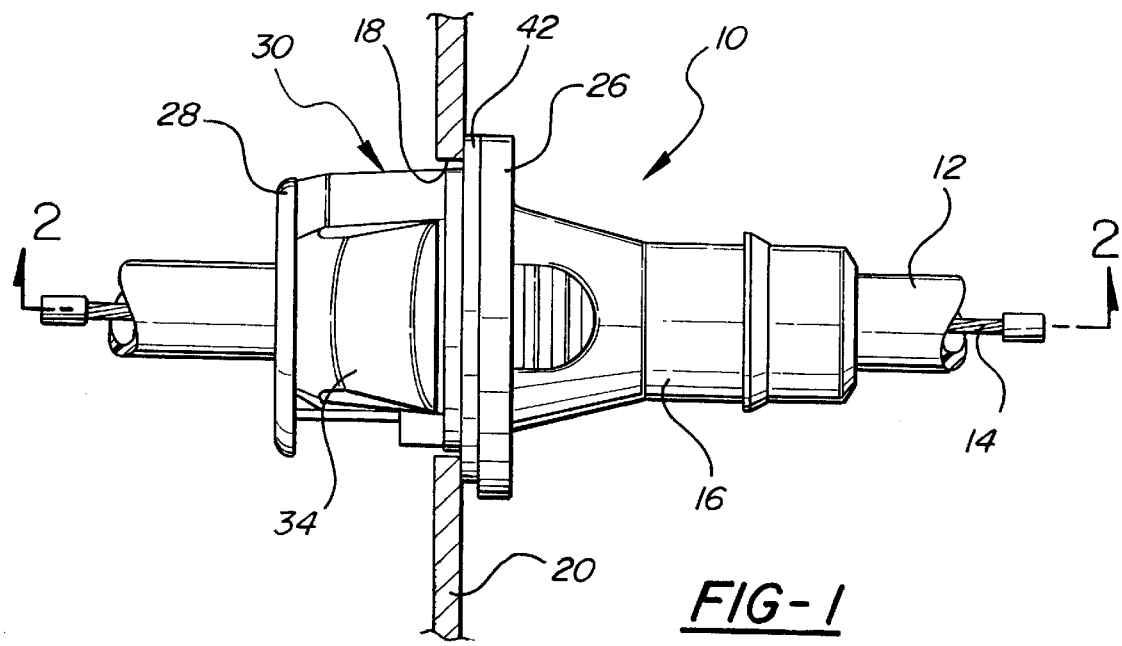
FIG. 1 is a top view of a preferred embodiment of the subject invention.
Figure 2:
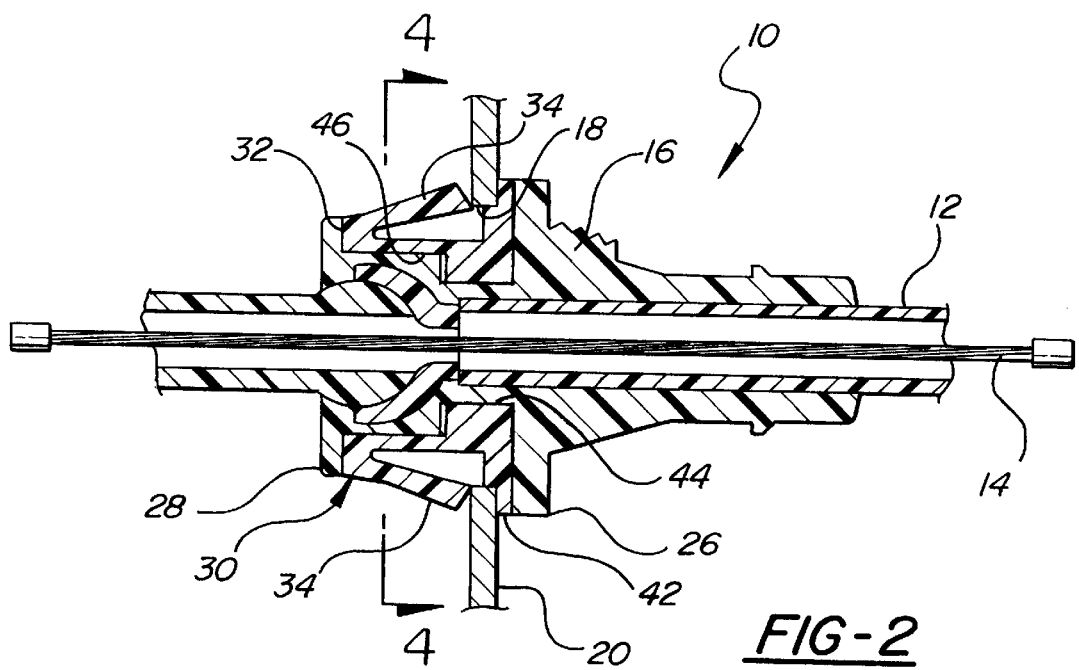
FIG. 2 is a cross sectional view taken substantially along line 2—2 of FIG. 1.

Referring to the Figures, wherein like numerals indicate like or corresponding parts throughout the several views, a motion transmitting remote control assembly is generally shown at 10. The assembly 10 comprises a conduit 12 and a motion transmitting core element 14 movably supported in the conduit 12. The conduit 12 can be of the well known type including an inner tubular liner surrounded by a plurality of wires or filaments disposed on a long helical lead and encased in a casing, the inner tubular lining and the casing being of organic polymeric material.

A support or end fitting 16 of hard plastic material is molded about the conduit 12 for supporting the conduit 12 through an aperture 18 in a support structure 20. The support fitting 16 includes a body portion 22 and 24. The support fitting 16 also includes first integral abutment or circular and radially extending flange 26 for facing one extremity of the aperture 18 and second integral abutment 28 spaced along the body portion 22 from the first abutment 26.

A U-shaped retaining member, generally indicated at 30, is removably mounted on the body portion 22 and has a first or end surface 32 engaging the second abutment 28 of the support fitting 16. The assembly 10 is characterized by the retaining member 30 including a pair of tabs 34 extending outwardly in a cantilever fashion from a position adjacent the first surface 32 to distal ends for engaging the support structure 20 about the aperture 18 between the tabs 34 and the first surface 32 for retaining the retaining member 30 and the fitting 16 tightly in the aperture 18 whereby the retaining member 30 may be removed from the body portion 22 and replaced by another like retaining member. The distal ends of the tabs 34 are angled to engage the edge of the aperture 18 in a support structure 20.

Figure 3:
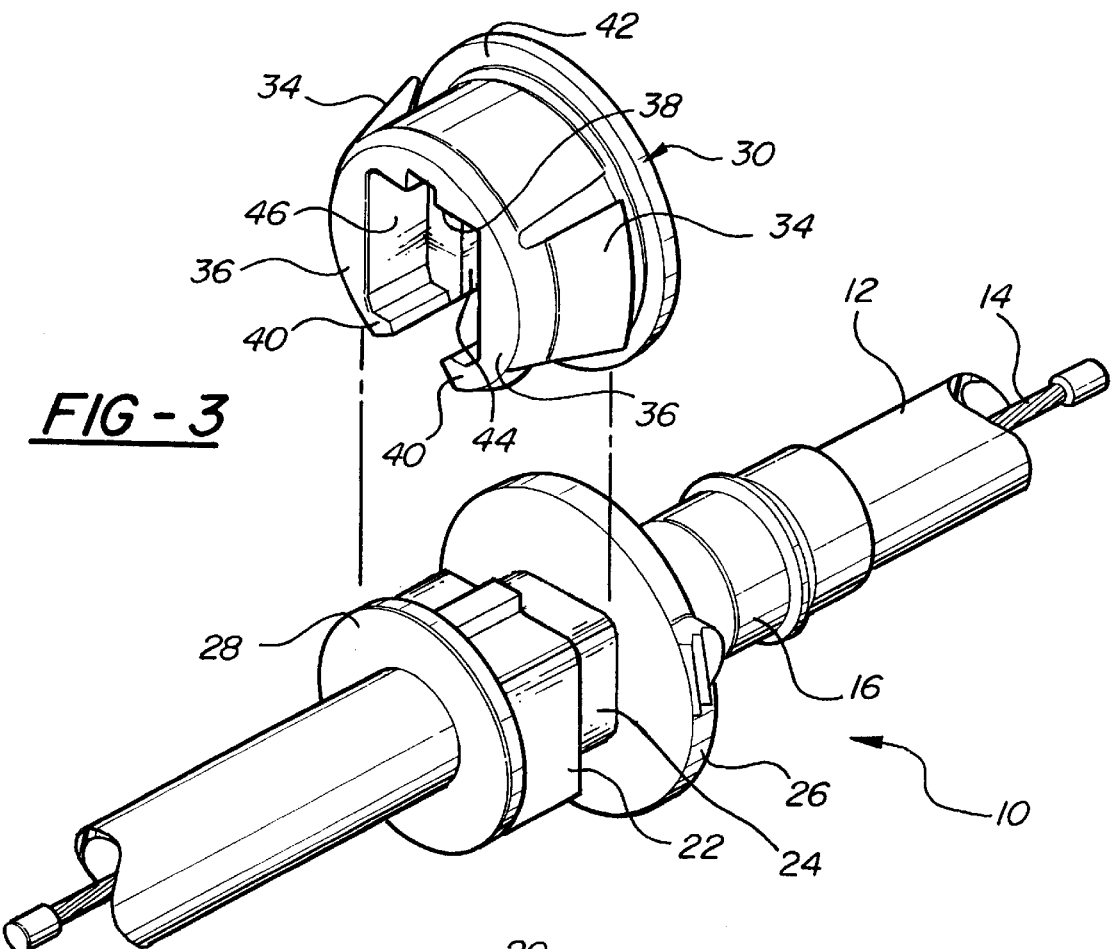
FIG. 3 a perspective view of the assembly of FIG. 1.
Figure 4:
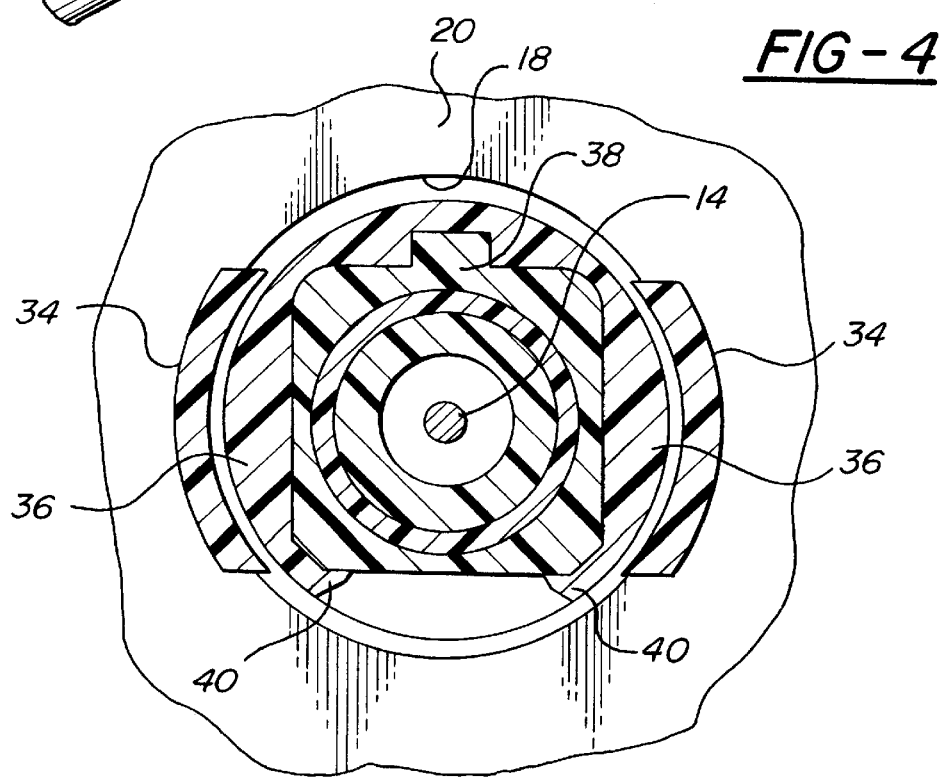
FIG. 4 is a cross sectional view taken along line 4—4 of FIG. 2.

More specifically, the U-shaped retaining member 30 includes a pair of legs 36 (as shown in FIGS. 3 & 4) interconnected by a base portion 38. The tabs 34 are disposed on the legs 36. The retaining member 30 includes catches 40 on the open ends of the legs 36 for retaining the retaining member 30 on the end fitting 16.

The retaining member 30 also includes a radial surface or flange 42 abutting the first 16 abutting the first abutment 26 of the support fitting 16 whereby said retaining member 30 extends through the aperture 18 to be retained on the fitting 16 as the radial flange 42 engages one side of the support structure 20 and the distal ends of the tabs 34 engage the other side of the support structure 20. The first 26 and second 28 abutments and the flange 42 are all circular and the first abutment 26 and the flange 42 are of equal diameter. In other words, the retaining member 30 extends between the two spaced abutments 26 and 28 of the support fitting 16 so that the retaining member 30 must be retained on the support fitting 16 when disposed in the aperture 18.

The end fitting 16 has a small mounting portion 24 adjacent the first abutment 26 and a large mounting portion 22 adjacent the second abutment 28 and the retaining member 30 includes within the U-shape thereof a small cavity 44 for snugly engaging the small mounting portion 24 and a large cavity 46 for snugly engaging the large mounting portion 22. The large 46 and small 44 cavities and mounting portions 22 and 24 are rectangular in cross section. However, the connection between the retaining member 30 and the fitting 16 could allow rotation of the retaining member 30 relative to the end fitting 16.

As alluded to above, the end fitting 16 is made of organic polymeric material and the retaining member 30 is made of organic polymeric material.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) comprising;

a conduit (12), a motion transmitting core element (14) having a longitudinal axis and supported for axial movement in said conduit (12), a support fitting (16) attached to said conduit (12) for supporting said conduit (12) through an aperture (18) in a support structure (20) and including a body portion (22 and 24) and first integral abutment (26) and second integral abutment (28) spaced axially along said body portion (22 and 24) from said first abutment (26), a U-shaped retaining member (30) having a U-shape which opens transversely to said body portion (22 and 24) for mounting on said body portion (22 and 24) in a direction transverse to said longitudnal axis and having a first surface (32) engaging the second abutment (28) of said support fitting (16), said retaining member (30) including a radial flange (42) abutting the first abutment (26) of said support fitting (16) and a pair of tabs (34) extending outwardly in a cantilever fashion from a position adjacent said first surface (32) to distal ends whereby said radial flange (42) engages one side of the support structure (20) and said distal ends of said tabs (34) engage the other side of the support structure (20) for retaining said retaining member (30) and said support fitting (16) tightly in said aperture (18) whereby said retaining member (30) may be removed from said body portion (22 and 24) in a direction transverse to said longitudinal axis and replaced by another like retaining member.

2. An assembly (10) as set forth in claim 1 wherein said U-shaped retaining member (30) includes a pair of legs (36) interconnected by a base portion (38), said tabs (34) being disposed on and extending transversely to said legs (36).

3. An assembly (10) as set forth in claim 2 wherein said retaining member (30) includes catches (40) on the open ends of said legs (36) for retaining said retaining member (30) on said support fitting (16).

4. An assembly (10) as set forth in claim 3 wherein said support fitting (16) has a small mounting portion (24) adjacent said first abutment (26) and a large mounting portion (22) adjacent said second abutment (28) and said retaining member (30) includes within the U-shape thereof a small cavity for snugly engaging said small mounting portion (24) and a large cavity for snugly engaging said large mounting portion (22).

5. An assembly (10) as set forth in claim 4 wherein said first (26) and second (28) abutments and said flange (42) are all circular.

6. An assembly (10) as set forth in claim 5 wherein said distal ends of said tabs (34) are angled to engage the edge of the aperture (18) in a support structure (20).

7. An assembly (10) as set forth in claim 5 wherein said support fitting (16) is made of organic polymeric material and said retaining member (30) is made of organic polymeric material.

8. An assembly (10) as set forth in claim 5 wherein said large (44) and small (46) cavities and mounting portions (22 and 24) are rectangular in cross section.

9. An assembly (10) as set forth in claim 5 wherein said first abutment (26) and said flange (42) are of equal diameter.

* * * * *